US012088995B2

(12) United States Patent
Liao et al.

(10) Patent No.: US 12,088,995 B2
(45) Date of Patent: Sep. 10, 2024

(54) SPEAKER

(71) Applicant: Lanto Electronic Limited, Kunshan (CN)

(72) Inventors: Kuan-Chun Liao, Kunshan (CN); Chiao-Fan Huang, Kunshan (CN); Chih-Chiang Cheng, Kunshan (CN); You-Yu Lin, Kunshan (CN); Hui-Yu Wang, Kunshan (CN)

(73) Assignee: LANTO ELECTRONIC LIMITED, Kunshan (CN)

(*) Notice: Subject to any disclaimer, the term of this patent is extended or adjusted under 35 U.S.C. 154(b) by 149 days.

(21) Appl. No.: 17/899,880

(22) Filed: Aug. 31, 2022

(65) Prior Publication Data

US 2023/0171533 A1 Jun. 1, 2023

(30) Foreign Application Priority Data

Dec. 30, 2021 (CN) ........................ 202123399619.9

(51) Int. Cl.
*H04R 1/28* (2006.01)
*H04R 1/02* (2006.01)
(Continued)

(52) U.S. Cl.
CPC ........... *H04R 1/2811* (2013.01); *H04R 1/025* (2013.01); *H04R 3/00* (2013.01); *H04R 7/12* (2013.01);
(Continued)

(58) Field of Classification Search
CPC ........ H04R 1/2811; H04R 1/025; H04R 3/00; H04R 7/12; H04R 7/18; H04R 9/025;
(Continued)

(56) References Cited

U.S. PATENT DOCUMENTS 3,326,321 A * 6/1967 Valuch .................. H04R 1/345 181/144
3,818,138 A * 6/1974 Sperrazza, Jr. ........ H04R 1/323 381/103
(Continued)

FOREIGN PATENT DOCUMENTS

CN 212909567 U 4/2021

*Primary Examiner* — Oyesola C Ojo
(74) *Attorney, Agent, or Firm* — Birch, Stewart, Kolasch & Birch, LLP

(57) ABSTRACT

A speaker is provided and includes a first speaker body, a second speaker body, a speaker component, and a sound transmission member. The first speaker body has a first chamber. The second speaker body has a second chamber. The second speaker body is received in the first chamber and defines a resonant cavity in the first chamber. The speaker component is disposed on the second speaker body and includes a supporting member, a magnet, a coil, and a diaphragm. Two ends of the supporting member are respectively inserted into the second chamber and fixed on the second speaker body. The magnet is disposed in the supporting member. The diaphragm is disposed on the supporting member and abuts against the second speaker body. The coil is received in the magnet and is connected to the diaphragm. The sound transmission member is coaxially disposed in the resonant cavity with the speaker component.

10 Claims, 4 Drawing Sheets

(51) Int. Cl.

| | |
|---|---|
| ***H04R 3/00*** | (2006.01) |
| ***H04R 7/12*** | (2006.01) |
| ***H04R 7/18*** | (2006.01) |
| ***H04R 9/02*** | (2006.01) |
| ***H04R 9/06*** | (2006.01) |

(52) U.S. Cl.
CPC ............... *H04R 7/18* (2013.01); *H04R 9/025* (2013.01); *H04R 9/06* (2013.01)

(58) Field of Classification Search
CPC . H04R 9/06; H04R 3/12; H04R 1/023; H04R 1/24; H04R 1/323; H04R 2201/025; H04R 2499/13; H04R 3/14; H04R 5/04; H04R 2201/021; H04R 1/345; H04R 5/02; H04R 2205/024; H04R 2430/01; H04R 1/403; H04R 1/028; H04R 2201/028; H04S 7/302
See application file for complete search history.

(56) References Cited

U.S. PATENT DOCUMENTS

| | | | | | |
|---|---|---|---|---|---|
| 4,348,549 | A * | 9/1982 | Berlant | H04R 1/345 | 381/99 |
| 4,953,223 | A * | 8/1990 | Householder | H04R 1/26 | 381/387 |
| 5,995,634 | A * | 11/1999 | Zwolski | H04R 1/028 | 381/388 |
| 7,388,963 | B2 * | 6/2008 | Han | H04R 1/2819 | 381/345 |
| 8,750,540 | B2 * | 6/2014 | Tan | H04R 1/345 | 381/186 |
| 8,757,317 | B1 * | 6/2014 | Wang | H04R 1/345 | 181/153 |
| 10,021,479 | B1 * | 7/2018 | Craig | H04R 1/20 | |
| 10,206,029 | B2 * | 2/2019 | Song | H04R 1/323 | |
| 10,306,356 | B2 * | 5/2019 | Katz | H04R 1/345 | |
| 10,397,696 | B2 * | 8/2019 | Sullivan | H04R 1/345 | |
| 10,491,984 | B2 * | 11/2019 | Honda | H04R 1/2826 | |
| 10,524,044 | B2 * | 12/2019 | Sheerin | H04R 1/2811 | |
| 10,595,120 | B1 * | 3/2020 | Combest | H04R 1/24 | |
| 10,652,650 | B2 * | 5/2020 | Johnson | H04R 1/26 | |
| 11,818,537 | B2 * | 11/2023 | Suzuki | H04R 9/06 | |
| 2002/0094095 | A1 * | 7/2002 | Ellis | H04R 9/045 | 381/431 |
| 2006/0280330 | A1 * | 12/2006 | Watanabe | H04R 9/022 | 381/397 |
| 2007/0144826 | A1 * | 6/2007 | An | H04R 1/26 | 181/148 |
| 2009/0028374 | A1 * | 1/2009 | Hashimoto | H04R 9/06 | 381/401 |
| 2010/0027833 | A1 * | 2/2010 | Takahashi | H04R 9/06 | 381/412 |
| 2014/0126761 | A1 * | 5/2014 | Pham | H04R 1/2811 | 381/353 |
| 2014/0219491 | A1 * | 8/2014 | Ludlum | H04R 1/02 | 381/387 |
| 2016/0088386 | A1 * | 3/2016 | Crosswell | H04R 1/025 | 381/349 |
| 2017/0055064 | A1 * | 2/2017 | Yoo | H04R 1/26 | |
| 2017/0238090 | A1 * | 8/2017 | Johnson | H04R 1/025 | 381/335 |
| 2018/0220212 | A1 * | 8/2018 | Lupfer | H04R 5/02 | |
| 2023/0188898 | A1 * | 6/2023 | Pfeffer | H04R 9/063 | 381/398 |
| 2023/0421948 | A1 * | 12/2023 | Nakamura | H04R 9/06 | |

* cited by examiner

SPEAKER

CROSS-REFERENCE TO RELATED APPLICATION

This non-provisional application claims priority under 35 U.S.C. § 119(a) to Patent Application No. 202123399619.9 filed in China, P.R.C. on Dec. 30, 2021, the entire contents of which are hereby incorporated by reference.

BACKGROUND

Technical Field

The instant disclosure relates to an energy conversion device, and in particular, to a speaker converting electrical signals into sound signals.

Related Arts

With developments of technology and continuous improvements of people's pursuit of lifestyle, for many consumers, when using entertainment electronic products (such as mobile phones, computers, or Televisions) to watch movies or listen to music, they will play the audio signal through additional speakers for achieving better audio-visual entertainment performance. Although consumers may have different needs for the speakers, speakers on the market usually suffer from severe attenuation upon dealing with high-frequency audio signals, thus resulting in poor user experience. Therefore, how to provide a speaker with better high-frequency signal processing performances is to be developed.

SUMMARY

In view of this, a speaker is provided. In one or some embodiments of the instant disclosure, the speaker comprises a first speaker body, a second speaker body, a speaker component, and a sound transmission member. The first speaker body has a first inner surface and a first outer surface opposite to the first inner surface, and the first inner surface is enclosed to form a first chamber. The second speaker body has a second inner surface and a second outer surface opposite to the second inner surface, and the second inner surface is enclosed to form a second chamber. The second speaker body is received in the first chamber, and the first chamber is separated by the second speaker body to define a resonant cavity in the first chamber. The speaker component is disposed on the second speaker body. The speaker component comprises a supporting member, a magnet, a coil, and a diaphragm. One of two ends of the supporting member is inserted into the second chamber, and the other end of the supporting member is fixed on the second outer surface. The magnet is disposed in the supporting member. The diaphragm is disposed on the supporting member and abuts against the second outer surface. The coil is received in the magnet, and one end of the coil is connected to the diaphragm. The sound transmission member is a cylindrical structure. The sound transmission member and the speaker component are coaxially disposed in the resonant cavity, and a diameter of the sound transmission member is ±30% of a diameter of the coil.

Therefore, according to one or some embodiments of the instant disclosure, the speaker can perform resonance upon dealing with high-frequency audio signals, thereby satisfying the requirements for processing high-frequency audio signals.

In one embodiment, the sound transmission member is disposed on a carrier plate, and the carrier plate is spacedly connected to the second outer surface.

In one embodiment, a vertical projection area of the diaphragm is less than an area of the carrier plate.

In one embodiment, the carrier plate and the second outer surface are connected with each other through a plurality of posts, and the posts are equidistantly and spacedly disposed on a periphery of the carrier plate.

In one embodiment, the posts are disposed between the carrier plate and the second outer surface along an axial direction. Each of the posts has a first length along the axial direction, the second speaker body has a second length along the axial direction, and a ratio of the second length to the first length is in a range between 2 and 2.6.

In one embodiment, a vertical distance between the speaker component and a center portion of one end of the sound transmission member adjacent to the speaker component is approximately equal to an amplitude of the diaphragm.

In one embodiment, the diaphragm has an amplitude, and a height between two ends of the sound transmission member along a direction perpendicular to the carrier plate is three to five times of the amplitude.

In one embodiment, an end surface of the sound transmission member adjacent to the speaker component has a first arc angle, and the first arc angle is configured along an outline of the sound transmission member.

In one embodiment, a connection portion between the sound transmission member and the carrier plate has a second arc angle, and the second arc angle is configured along an outline of the sound transmission member.

In one embodiment, the speaker further comprises a counterweight structure. The counterweight structure is disposed in the resonant cavity. The sound transmission member is between the counterweight structure and the second speaker body.

In one embodiment, the speaker further comprises a power supply. The speaker component is disposed at one of two ends of the second speaker body, the other end of the second speaker body has a recess, and the power supply is received in the recess.

In one embodiment, the speaker further comprises a first control module and a second control module. The first control module and the second control module are disposed at two opposite ends of the first speaker body.

BRIEF DESCRIPTION OF THE DRAWINGS

This disclosure will become more fully understood from the detailed description given herein below for illustration only and thus not limitative of this disclosure, wherein.

DETAILED DESCRIPTION

Figure 1:
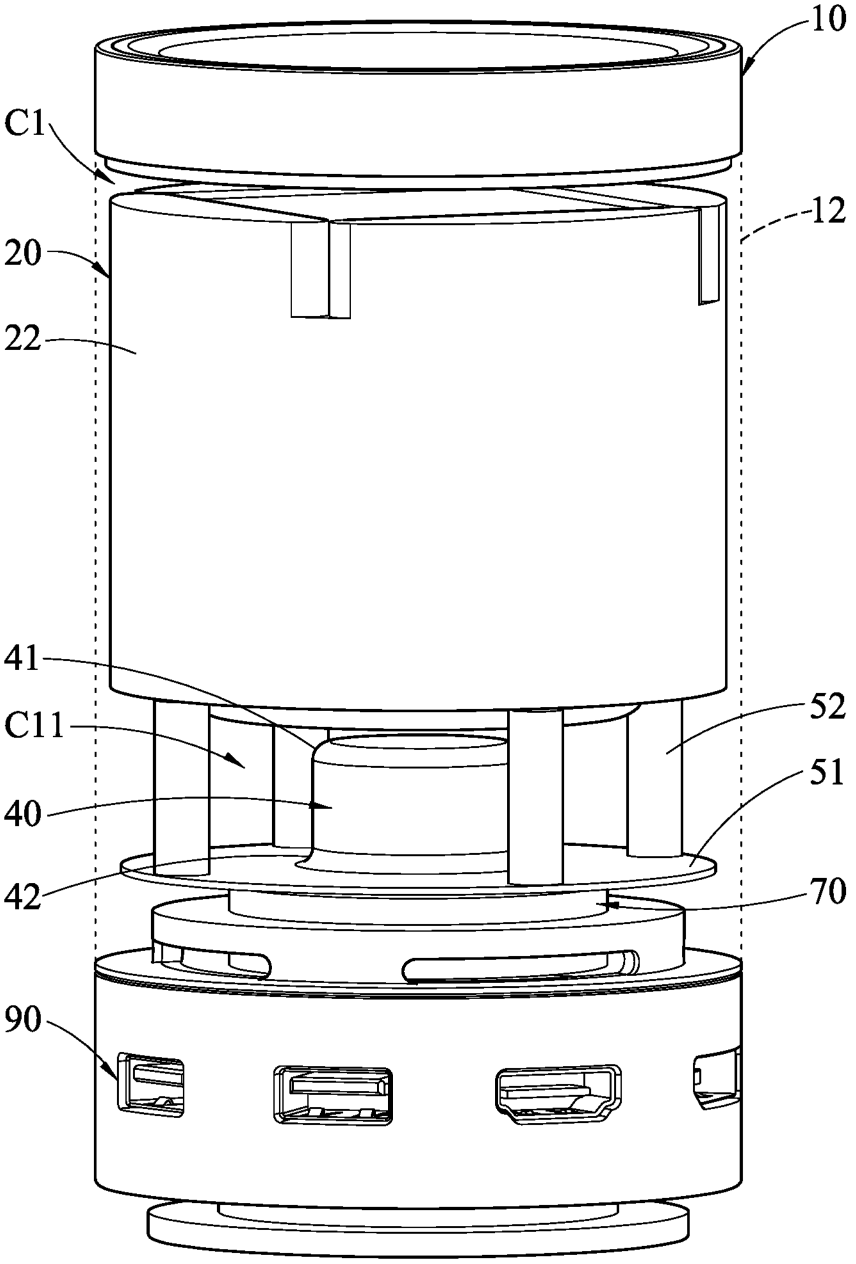
FIG. 1 illustrates a perspective view of a speaker according to an exemplary embodiment of the instant disclosure.
Figure 2:
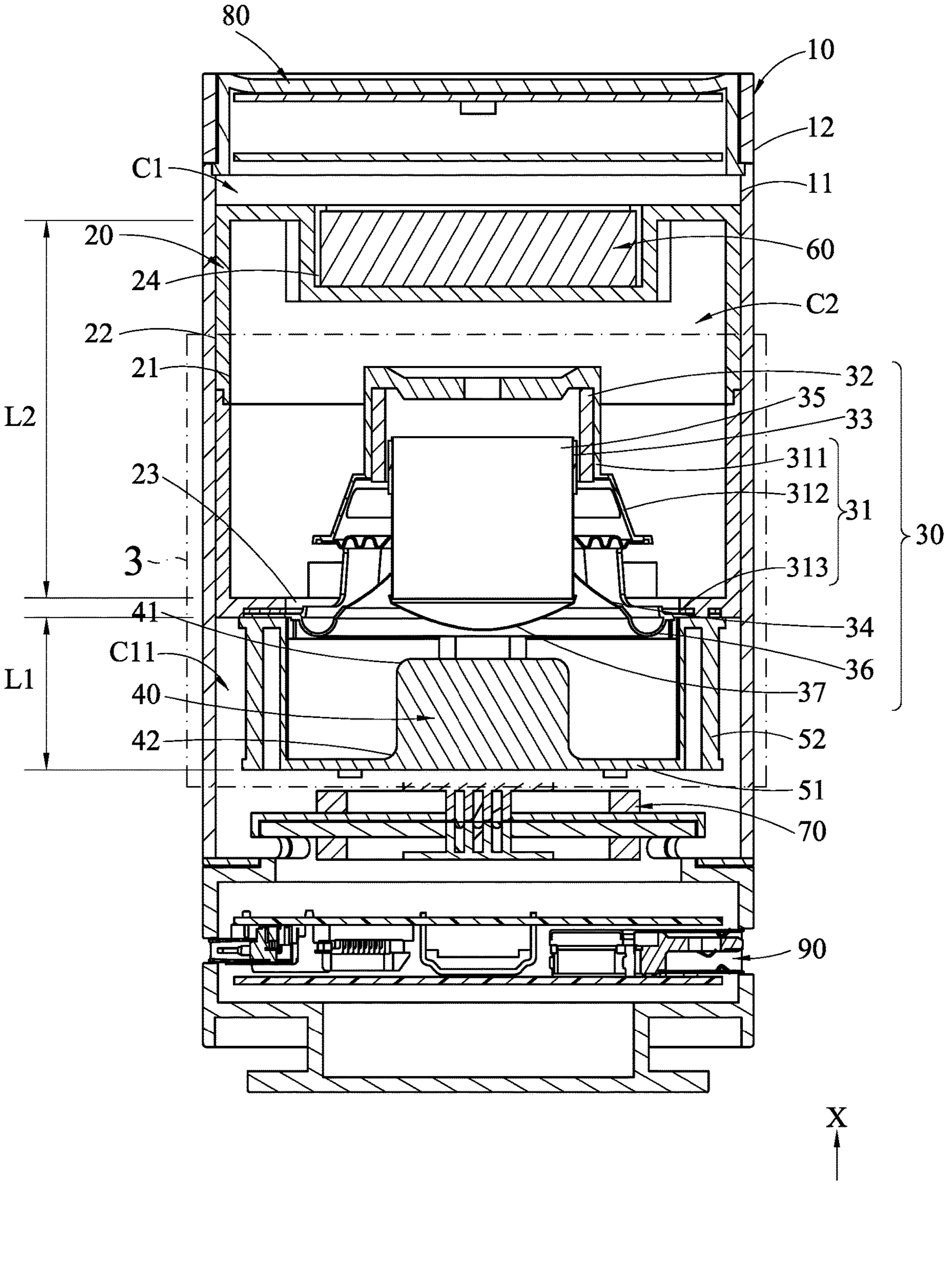
FIG. 2 illustrates a cross-sectional view of a speaker according to an exemplary embodiment of the instant disclosure.
Figure 3:
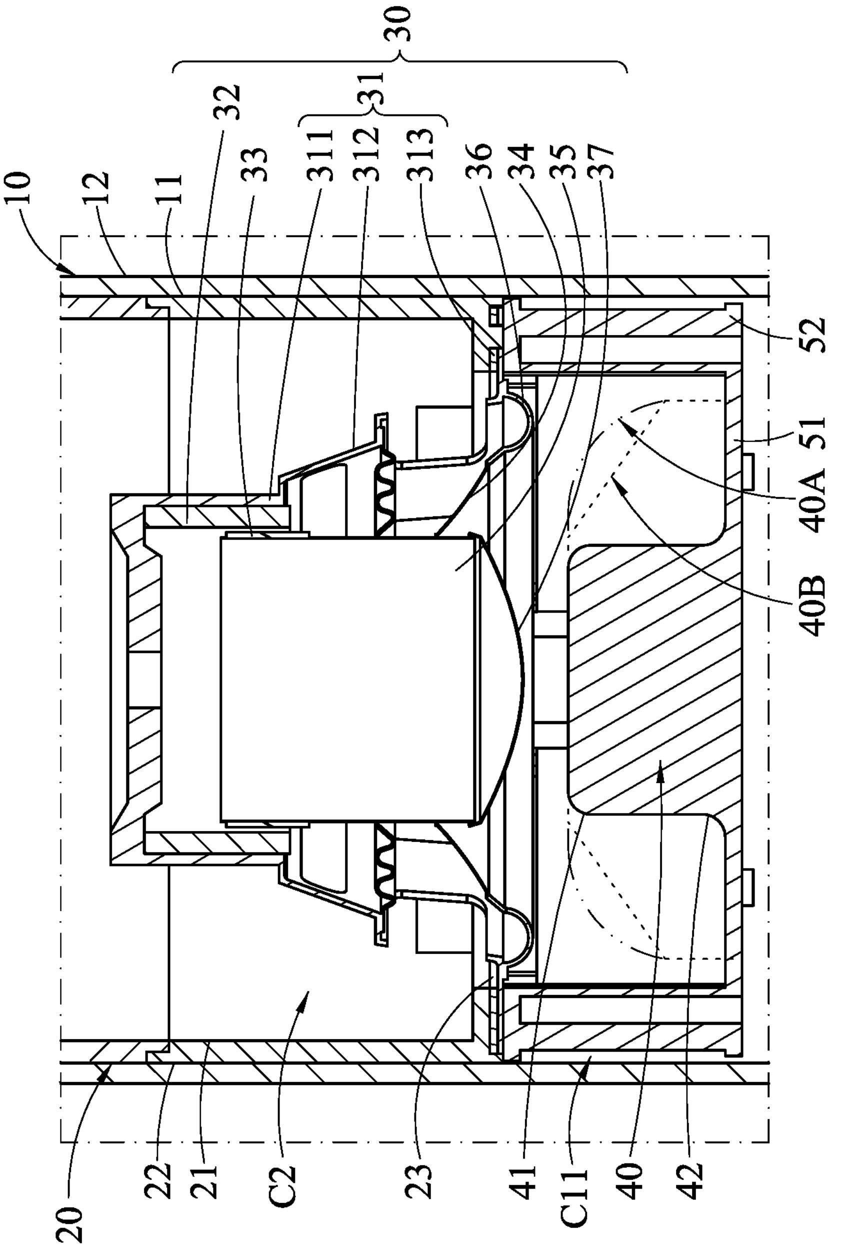
FIG. 3 illustrates an enlarged partial view of the enclosed portion 3 shown in FIG. 2.

Please refer to FIG. 1 to FIG. 3. FIG. 1 illustrates a perspective view of a speaker according to an exemplary embodiment of the instant disclosure. FIG. 2 illustrates a cross-sectional view of a speaker according to an exemplary embodiment of the instant disclosure. FIG. 3 illustrates an enlarged partial view of the enclosed portion 3 shown in FIG. 2. In this embodiment, the speaker comprises a first speaker body 10, a second speaker body 20, a speaker component 30, and a sound transmission member 40.

The first speaker body 10 is a hollow tube structure and has a first inner surface 11 and a first outer surface 12 opposite to the first inner surface 11. The first inner surface 11 is enclosed to form a first chamber C1. In some embodiments, the first speaker body 10 is a hollow cylindrical structure. In this embodiment, the outline of the first outer surface 12 is round-shaped, and sound-output holes can be configured along the circumference of the first outer surface. Hence, in this embodiment, the first speaker body can be a non-directional speaker body capable of allowing the sound to be outputted from any orientation (360 degrees sound output).

The second speaker body 20 is a hollow tube structure and has a second inner surface 21 and a second outer surface 22 opposite to the second inner surface 21. The second inner surface 21 is enclosed to form a second chamber C2, and the second speaker body 20 is received in the first chamber C1 of the first speaker body 10, so that the first chamber C1 is separated by the second speaker body 20 to define a resonant cavity C11 in the first chamber C1. In some embodiments, the second speaker body 20 is a hollow cylindrical structure, and the height of the second speaker body 20 is less than the height of the first speaker body 10. In this embodiment, the outer diameter of the second speaker body 20 is approximately equal to the inner diameter of the first speaker body 10, and the length between two ends of the second speaker body 20 is less than the length between two ends of the first chamber C1 of the first speaker body 10. Therefore, when the second speaker body 20 is received in the first chamber C1, the second outer surface 22 of the second speaker body 20 is abutting against the first inner surface 11 of the first speaker body 10. Hence, in this embodiment, the first chamber C1 can be separated by the second speaker body 20 to define an individual resonant cavity C11. Moreover, one of two ends of the second speaker body 20 has an opening 23, and the opening 23 is in communication with the second chamber C2.

The speaker component 30 is disposed on the second speaker body 20 and comprises a supporting member 31, a magnet 32, a coil 33, and a diaphragm 34. The speaker component 30 is disposed in the opening 23 of the second speaker body 20 and faces the resonant cavity C11 for sound output. In this embodiment, the second outer surface 22 of the second speaker body 20 abuts against the first inner surface 11 of the first speaker body 10, and the speaker component 30 is disposed in the opening 23 and faces the resonant cavity C11. Therefore, the resonant cavity C11 and the rest portion of the first chamber C1 nearby the other end of the second speaker body 20 are separated by the second speaker body 20. Therefore, during the speaker component 30 outputs sounds, since the audio signals of two opposite ends of the speaker component 30 have opposite phases, when the gases at the two opposite ends of the speaker component 30 are separated from each other, the audio signals with different phases can be prevented from contacting each other which will cause the offset of the audio signals. Hence, the sound emitted by the speaker component 30 can be ensured to be retained in the resonant cavity C11 to have resonance so as to obtain an optimized audio effect.

The supporting member 31 is adapted to loading the magnet 32, the coil 33, and the diaphragm 34. In some embodiments, one of two ends of the supporting member 31 is inserted into the second chamber C2, and the other end of the supporting member 31 is fixed on the second outer surface 22 of the second speaker body 20. The supporting member 31 comprises a base 311, an extension portion 312, and a supporting portion 313. The base 311, the extension portion 312, and the supporting portion 313 are sequentially connected to each other. In some embodiments, the base 311 is cylindrical-shaped and has a recess. The supporting portion 313 is ring-shaped. The extension portion 312 extends from the base 311 to the supporting portion 313 (in this embodiment, a width of the extension portion 312 adjacent to the base 311 is less than a width of the extension portion 312 adjacent to the supporting portion 313). In these embodiments, the supporting portion 313 of the supporting member 31 abuts against the second outer surface 22 of the second speaker body 20, the supporting portion 313 is configured along the profile of the opening 23 of the second speaker body 20, and the base 311 is in the second chamber C2.

The magnet 32 is disposed in the supporting member 31 for generating a magnetic field. In some embodiments, the magnet 32 is ring-shaped and is received in the recess of the base 311. When the magnet 32 is received in the recess of the base 311, the outer surface of the magnet 32 is attached to the inner surface of the recess of the base 311.

The coil 33 is movably received in the magnet 32. The coil 33 is adapted to be reacted with the magnet 32 to convert electrical energies into mechanical energies. In some embodiments, the coil 33 may be wound on a shaft 35 and then received in the magnet 32.

Please refer to FIG. 2 and FIG. 3. The diaphragm 34 is disposed on the supporting member 31 and abuts against the second outer surface 22 of the second speaker body 20. In some embodiments, one of two ends of the diaphragm 34 is connected to the coil 33 through the shaft 35, so that the diaphragm 34 is driven by the coil 33 to push the air surrounding the diaphragm 34 to vibrate so as to generate sounds; the other end of the diaphragm 34 is connected to the second outer surface 22. In some embodiments, the other end of the diaphragm 34 is connected to the second outer surface 22 of the second speaker body 20 through an edge 36. The edge 36 is made of an elastic resilient material to provide the diaphragm 34 with an elastic resilient force.

Please refer to FIG. 2 and FIG. 3. In some embodiments, the diaphragm 34 is conical-shaped, and a center portion of the diaphragm 34 has a through hole. In these embodiments, the diaphragm 34 is fitted over the shaft 35 through the through hole so as to be connected to the coil 33. Moreover, in order to prevent external dusts or debris from entering into the interior of the speaker component 30, the speaker component 30 may further comprise a dustproof cover 37 to cover the through hole of the diaphragm 34. In this embodiment, the dustproof cover 37 is semi-spherical shaped.

The sound transmission member 40 is a cylindrical structure, and the sound transmission member 40 and the speaker component 30 are coaxially disposed in the resonant cavity C11. In this embodiment, the term cylindrical structure indicates that the two end surfaces of the sound transmission member 40 are both round-shaped, and the sound transmission member 40 has a uniform diameter between the two ends of the sound transmission member 40. In some embodiments, one of the two ends of the sound transmission member 40 is connected to a carrier plate 51, and the other end of the sound transmission member 40 extends toward the speaker component 30 and is spaced from the speaker component 30. In this embodiment, an extension direction of the sound transmission member 40 from the carrier plate 51 toward the speaker component 30 is perpendicular to the carrier plate 51. In some embodiments, the diameter of the sound transmission member 40 is ±30% of a diameter of the coil 33.

Therefore, when the coil 33 is electrified to generate a magnetic field, the current with alternately changing positive/negative poles causes the interaction between the coil 33 and the magnet 32 to attract or repel each other. Then, the coil 33 can drive the diaphragm 34 to push the air to generate sounds. During the operation of the diaphragm 34, along with the change of the vibration frequency of the diaphragm 34, different portions of the diaphragm 34 may have different vibration modes. Wherein, when the audio signal is a low frequency signal, the vibration of the diaphragm 34 is concentrated at the peripheral portion of the diaphragm 34; however, when the frequency of the audio signal becomes higher, the vibration energies of the diaphragm 34 start to be concentrated toward the center portion of the diaphragm 34; while when the frequency of the audio signal is a high frequency signal, most vibration energies are concentrated at the center portion of the diaphragm 34.

Figure 4:
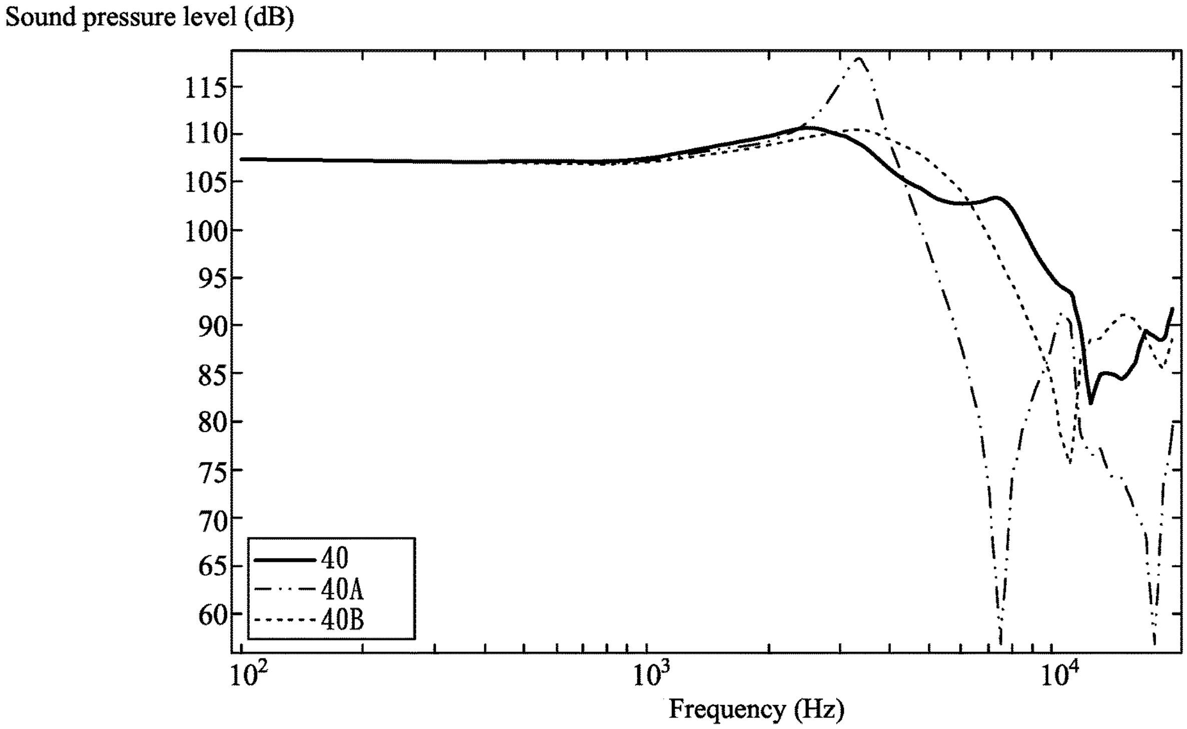
FIG. 4 illustrates a frequency response graph of a speaker according to an exemplary embodiment and a speaker of a comparative example.

Therefore, in one or some embodiments of the instant disclosure, since the position of the sound transmission member 40 mostly corresponds to the center portion of the diaphragm 34, the sound transmission member 40 can generate resonance to obtain a better high-frequency extension effect when the audio signal is a high frequency signal. As shown in FIG. 3 and FIG. 4, where FIG. 3 illustrates comparative examples of a sound transmission member 40A with an extremely large size and a sound transmission member 40B with bevels, and FIG. 4 illustrates a frequency response graph of a speaker according to an exemplary embodiment and a speaker of a comparative example. As shown in FIG. 4, the sound transmission member 40 according to one or some embodiments of the instant disclosure provides a better high-frequency extension effect as compared with the comparative examples.

Based on the above, the center portion of the diaphragm 34 is the portion of the diaphragm 34 connected to the coil 33. Therefore, preferably, in one embodiment, the diameter of the sound transmission member 40 is approximately equal to the diameter of the coil 33. Hence, the sound transmission member 40 can provide a better high-frequency extension effect.

In some embodiments, to prevent noise generation and ensure that the sound waves generated by the diaphragm 34 can be concentrated at the sound transmission member 40 to generate resonance, the carrier plate 51 is a round plate, and a vertical projection area of the diaphragm 34 is less than an area of the carrier plate 51. Therefore, the sound waves generated by the diaphragm 34 are ensured to be within the carrier plate 51, so that the sound waves can be resonant with the sound transmission member 40 to generate high-frequency resonance.

In some embodiments, in order to increase the volume of the sounds emitted by the speaker, the sound transmission member 40 is configured as a hollow structure. Hence, when the diaphragm 34 generates the sound waves, the sound waves are emitted toward the sound transmission member 40. Thus, owing to the hollow structure of the sound transmission member 40, the sound transmission member can be forced to vibrate more easily, so that the contact area between the sound waves and the air surrounding the sound waves can be increased. Therefore, the efficiency of air radiated sound energy is increased, thereby increasing the volume of the speaker.

In some embodiments, in order to facilitate the spreading of the sound waves, an end surface of the sound transmission member 40 adjacent to the speaker component 30 has a first arc angle 41, and the first arc angle 41 is configured along the round outline of the sound transmission member 40. Moreover, a connection portion between the sound transmission member 40 and the carrier plate 51 has a second arc angle 42, and the second arc angle 42 is configured along the round outline of the sound transmission member 40. In this embodiment, the change of the diameter of the sound transmission member 40 is retained with in a range of ±30% of the diameter of the coil 33.

In some embodiments, the carrier plate 51 is spacedly connected to the second outer surface 22 of the second speaker body 20 through a plurality of posts 52. In this embodiment, the posts 52 are connected to portions of the second outer surface 22 which are at the end of the second speaker body 20 having the opening 23. Therefore, the sound transmission member 40 can be floatingly disposed in the resonant cavity C11, so that the sound transmission member 40 can be resonant with the sound waves. In these embodiments, the carrier plate 51 is round-shaped, the posts 52 are cylindrical-shaped, and the posts 52 are equidistantly and spacedly disposed on a periphery of the carrier plate 51.

In some embodiments, the posts 52 are disposed between the carrier plate 51 and the second speaker body 20 along an axial direction X. Each of the posts 52 has a first length L1 along the axial direction X, and the second speaker body 20 has a second length L2 along the axial direction X. In these embodiments, a ratio of the second length L2 to the first length L1 is in a range between 2 and 2.6. Accordingly, the speaker component 30 can have a better ratio of the front side sound cavity to the rear side sound cavity, so that the speaker component 30 can process the high frequency signals properly to ensure the reproduction of the high frequency signals.

In some embodiments, in order to facilitate the resonance, the distance between the sound transmission member 40 and the speaker component 30 is configured as short as possible. With the consideration of the space requirement for the diaphragm 34 of the speaker component 30 to push the air, a vertical distance between the speaker component 30 and a center portion of the end of the sound transmission member 40 adjacent to the speaker component 30 should be at least approximately equal to an amplitude of the diaphragm 34 of the speaker component 30 at rated power. Therefore, it is ensured that the operation of the diaphragm 34 can be achieved sufficiently and completely, so that the diaphragm 34 can perform a better resonance effect with the sound transmission member 40. Moreover, in some embodiments, a height between the two ends of the sound transmission member 40 along a direction perpendicular to the carrier plate 51 is three to five times of the amplitude of the diaphragm 34.

In some embodiments, the speaker further comprises a power supply 60. In this embodiment, the speaker component 30 is disposed at one of two ends of the second speaker body 20, the other end of the second speaker body 20 has a recess 24, and the power supply 60 is received in the recess 24 and electrically connected to the coil 33. Therefore, the speaker with the power supply 60 can be served as a portable speaker.

In some embodiments, in order to allow the speaker to be placed stably, the speaker further comprises a counterweight structure 70, and the counterweight structure 70 is disposed in the resonant cavity C11 and at one side of the sound transmission member 40. In this embodiment, the sound transmission member 40 is between the counterweight structure 70 and the second speaker body 20. Therefore, the weight distribution of the second speaker body 20 can be balanced, thereby increasing the stability of the speaker upon the speaker is placed.

In the embodiment that the power supply 60 is disposed at the second speaker body 20, a first control module 80 may be disposed on a portion of the first outer surface 12 at an end of the first speaker body 10 adjacent to the power supply 60, and the first control module 80 is electrically connected to the power supply 60. In some embodiments, the first control module 80 may be a control panel with buttons. Therefore, the user can turn on or off the speaker or can perform various functions of the speaker through the first control module 80 disposed at the first outer surface 12 of the first speaker body 10.

In the embodiment that the first control module 80 is disposed at the first speaker body 10, a second control module 90 may be disposed on an end of the first speaker body 10 away from the first control module 80, and the second control module 90 is electrically connected to the speaker component 30. The second control module 90 may be various of audio input ports. Therefore, the user can connect the speaker with different audio signal sources through the second control module 90.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A speaker, comprising:

a first speaker body having a first inner surface and a first outer surface opposite to the first inner surface, wherein the first inner surface is enclosed to form a first chamber;

a second speaker body having a second inner surface and a second outer surface opposite to the second inner surface, wherein the second inner surface is enclosed to form a second chamber; the second speaker body is received in the first chamber, and the first chamber is separated by the second speaker body to define a resonant cavity in the first chamber;

a speaker component disposed on the second speaker body, wherein the speaker component comprises a supporting member, a magnet, a coil, and a diaphragm; one of two ends of the supporting member is inserted into the second chamber, and the other end of the supporting member is fixed on the second outer surface; the magnet is disposed in the supporting member; the diaphragm is disposed on the supporting member and abuts against the second outer surface; the coil is received in the magnet, and one end of the coil is connected to the diaphragm; and a sound transmission member, wherein the sound transmission member is a cylindrical structure; the sound transmission member and the speaker component are coaxially disposed in the resonant cavity, and a diameter of the sound transmission member is +30% of a diameter of the coil, wherein the two end surfaces of the sound transmission member are both round-shaped, and the sound transmission member has a uniform diameter between the two ends of the sound transmission member, an end surface of the sound transmission member adjacent to the speaker component has a first arc angle, and the first arc angle is configured along an outline of the sound transmission member, a connection portion between the sound transmission member and the carrier plate has a second arc angle, and the second arc angle is configured along an outline of the sound transmission member.

2. The speaker according to claim 1, wherein the sound transmission member is disposed on a carrier plate, and the carrier plate is spacedly connected to the second outer surface.

3. The speaker according to claim 2, wherein a vertical projection area of the diaphragm is less than an area of the carrier plate.

4. The speaker according to claim 2, wherein the carrier plate and the second outer surface are connected with each other through a plurality of posts, and the posts are equidistantly and spacedly disposed on a periphery of the carrier plate.

5. The speaker according to claim 4, wherein the posts are disposed between the carrier plate and the second outer surface along an axial direction; each of the posts has a first length along the axial direction, the second speaker body has a second length along the axial direction, and a ratio of the second length to the first length is in a range between 2 and 2.6.

6. The speaker according to claim 1, wherein a vertical distance between the speaker component and a center portion of one end of the sound transmission member adjacent to the speaker component is approximately equal to an amplitude of the diaphragm.

7. The speaker according to claim 2, wherein the diaphragm has an amplitude, and a height between two ends of the sound transmission member along a direction perpendicular to the carrier plate is three to five times of the amplitude.

8. The speaker according to claim 1, further comprising a counterweight structure disposed in the resonant cavity, wherein the sound transmission member is between the counterweight structure and the second speaker body.

9. The speaker according to claim 1, further comprising a power supply, wherein the speaker component is disposed at one of two ends of the second speaker body, the other end of the second speaker body has a recess, and the power supply is received in the recess.

10. The speaker according to claim 1, further comprising a first control module and a second control module, wherein the first control module and the second control module are disposed at two opposite ends of the first speaker body.

* * * * *